(12) United States Patent
Kitaji et al.

(10) Patent No.: US 8,374,126 B2
(45) Date of Patent: Feb. 12, 2013

(54) COMMUNICATION ROUTE CONTROLLER, RADIO COMMUNICATION DEVICE, COMMUNICATION ROUTE CONTROLLING METHOD AND COMMUNICATION METHOD FOR RADIO COMMUNICATION DEVICE

(75) Inventors: Mitsuhiro Kitaji, Yokohama (JP); Tomoyoshi Yokota, Yokohama (JP)

(73) Assignee: Kyocera Corporation, Kyoto (JP)

( * ) Notice: Subject to any disclaimer, the term of this patent is extended or adjusted under 35 U.S.C. 154(b) by 77 days.

(21) Appl. No.: 12/294,878

(22) PCT Filed: Mar. 28, 2007

(86) PCT No.: PCT/JP2007/056730
§ 371 (c)(1),
(2), (4) Date: Jun. 24, 2010

(87) PCT Pub. No.: WO2007/114194
PCT Pub. Date: Oct. 11, 2007

(65) Prior Publication Data
US 2010/0254306 A1    Oct. 7, 2010

(30) Foreign Application Priority Data
Mar. 28, 2006    (JP) ................. P2006-089134

(51) Int. Cl.
*H04W 4/00* (2009.01)
*H04L 12/26* (2006.01)
(52) U.S. Cl. ........................................ 370/328; 370/248
(58) Field of Classification Search .................. 370/328
See application file for complete search history.

(56) References Cited

U.S. PATENT DOCUMENTS

| 6,360,271 | B1 * | 3/2002 | Schuster et al. | 709/231 |
|---|---|---|---|---|
| 7,483,450 | B1 * | 1/2009 | Giese et al. | 370/507 |
| 2003/0142651 | A1 * | 7/2003 | Matta et al. | 370/338 |
| 2004/0001477 | A1 * | 1/2004 | D'Amico et al. | 370/352 |
| 2004/0174853 | A1 | 9/2004 | Saito et al. | |
| 2004/0213205 | A1 * | 10/2004 | Li et al. | 370/352 |
| 2005/0018613 | A1 | 1/2005 | Yokota | |
| 2005/0105512 | A1 * | 5/2005 | Myhre et al. | 370/352 |
| 2005/0185653 | A1 | 8/2005 | Ono et al. | |

(Continued)

FOREIGN PATENT DOCUMENTS
JP    04040139 A    2/1992
JP    07303117 A    11/1995

(Continued)

OTHER PUBLICATIONS

Chinese language office action dated Jan. 19, 2011 and its English language translation for corresponding Chinese application 200780011415.7.

(Continued)

*Primary Examiner* — Derrick Ferris
*Assistant Examiner* — Gerald Smarth
(74) *Attorney, Agent, or Firm* — DLA Piper LLP (US)

(57) ABSTRACT

A switching server 100 relays VoIP packets transmitted from a cellular phone terminal 300A to an IP phone terminal 42, and sequentially acquires the receiving times of the VoIP packets received from the cellular phone terminal 300A. In addition, the switching server 100 switches a communication route R1 via a radio IP network 10A to a communication route R2 via a radio IP network 10B, on the basis of the multiple receiving times thus acquired.

4 Claims, 7 Drawing Sheets

U.S. PATENT DOCUMENTS

| | | | |
|---|---|---|---|
| 2005/0281204 A1* | 12/2005 | Karol et al. | 370/248 |
| 2006/0039335 A1 | 2/2006 | Ono et al. | |
| 2006/0045069 A1 | 3/2006 | Zehavi et al. | |
| 2006/0276193 A1* | 12/2006 | Itzkovitz et al. | 455/445 |
| 2010/0254306 A1* | 10/2010 | Kitaji et al. | 370/328 |

FOREIGN PATENT DOCUMENTS

| | | |
|---|---|---|
| JP | 2002319965 A | 10/2002 |
| JP | 2002344497 A | 11/2002 |
| JP | 2002354145 A | 12/2002 |
| JP | 2004112334 A | 4/2004 |
| JP | 2004207964 A | 7/2004 |
| JP | 2004357213 A | 12/2004 |

OTHER PUBLICATIONS

Wong et al., "Soft Handoffs in CDMA Mobile Systems" IEEE Peronal Communciations, 1997.

Capone et al., "Efficient Polling Schemes for Bluetooth picocells" IEEE, 2001.

Korean language office action dated Jun. 21, 2010 and its English language translation for corresponding Korean application 1020087026219 lists the references above.

International Search Report for corresponding PCT application PCT/JP2007/056730 lists the references above.

Extended European search report dated Feb. 3, 2012 issued in corresponding European application 07740168.5 cites the U.S. patent application publications above.

Japanese language office action dated Mar. 6, 2012 and its English language translation issued in corresponding Japanese application 2010108742 cites the foreign patent document above.

Japanese language office action dated Oct. 2, 2012, and its English translation issued in corresponding Japanese application 2010108742.

* cited by examiner

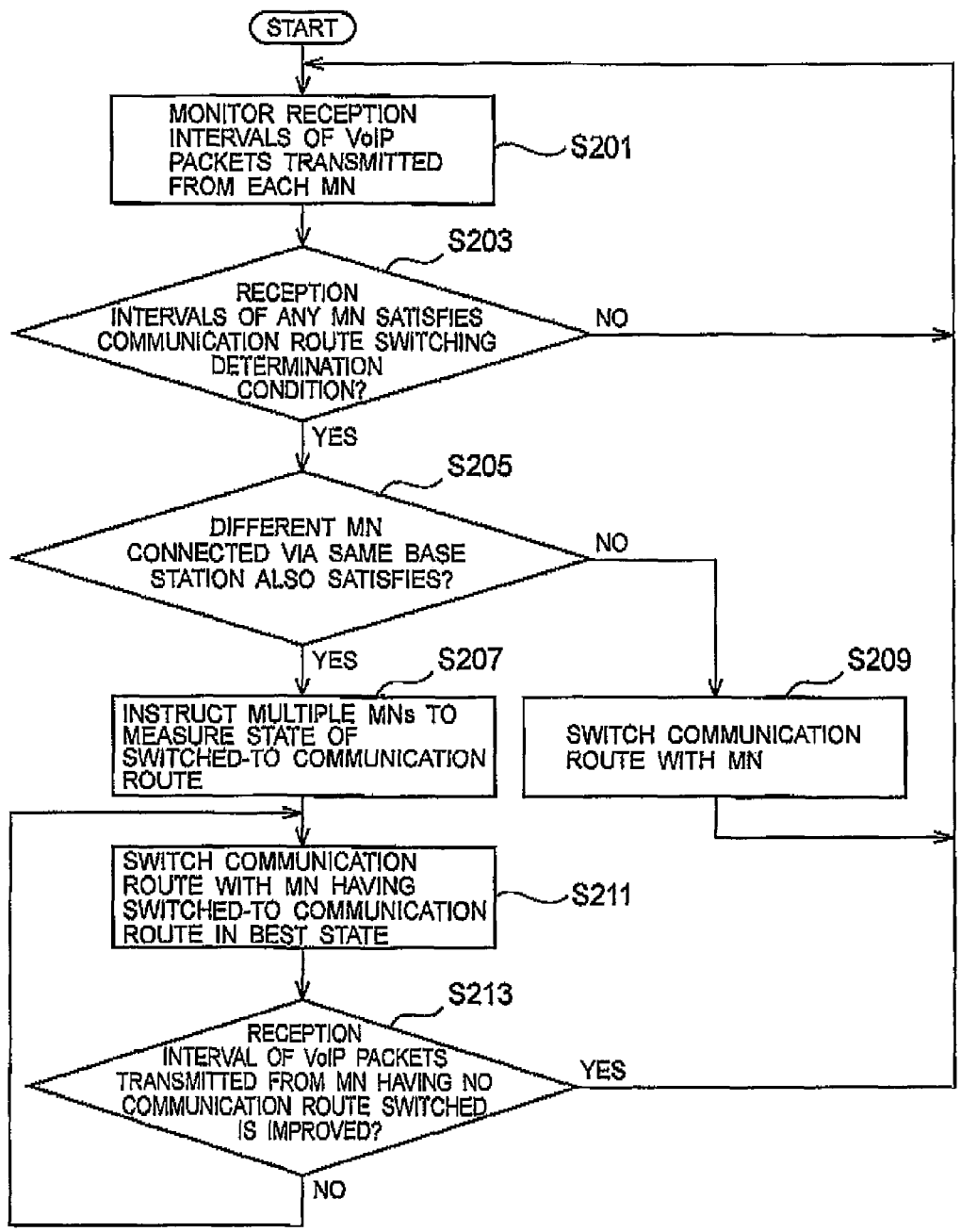

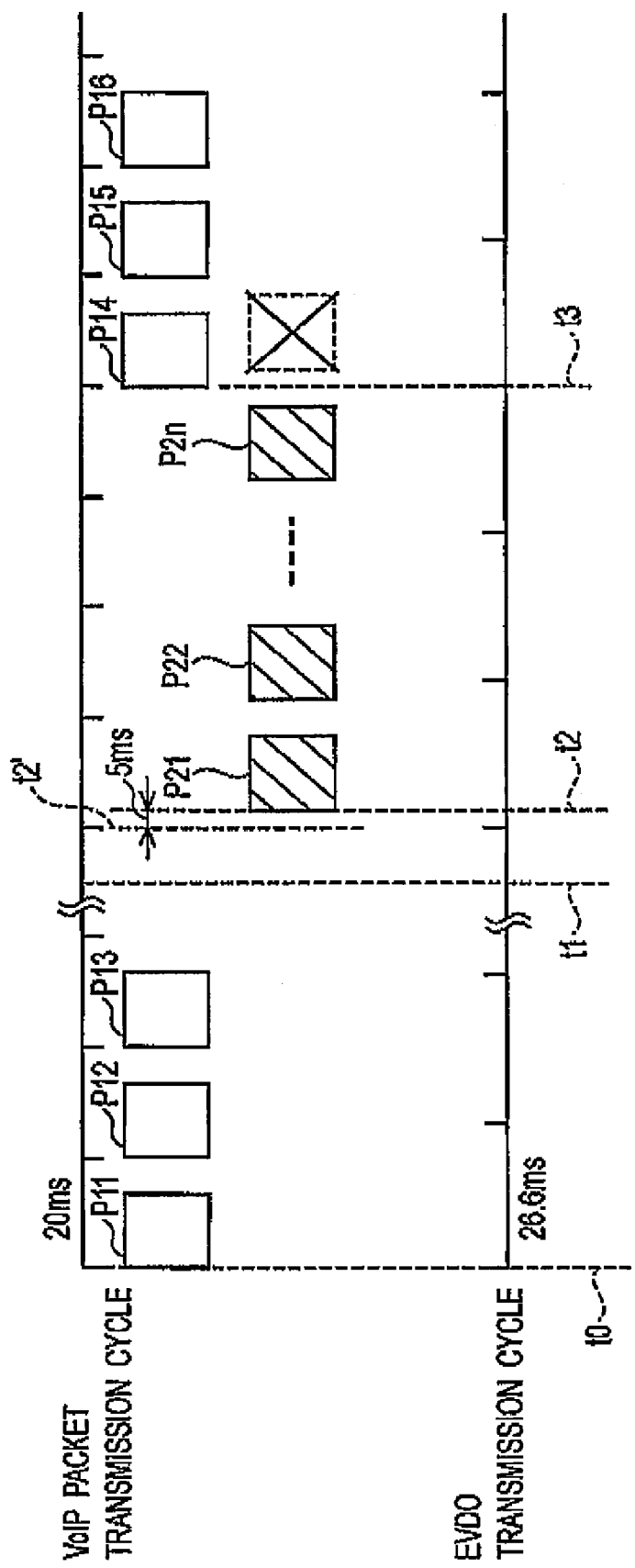

COMMUNICATION ROUTE CONTROLLER, RADIO COMMUNICATION DEVICE, COMMUNICATION ROUTE CONTROLLING METHOD AND COMMUNICATION METHOD FOR RADIO COMMUNICATION DEVICE

CROSS-REFERENCE TO RELATED APPLICATIONS

This application is a national stage of international application no. PCT/JP2007/056730, filed on Mar. 28, 2007, and claims the benefit of priority under 35 USC 119 of Japanese patent application no. 2006-089134, filed on Mar. 28, 2006. The entire contents of these applications are incorporated herein by reference.

TECHNICAL FIELD

The present invention relates to a communication route controller and a communication route controlling method for controlling a communication route to a radio communication device connect able to multiple radio IP networks, and relates to a radio communication device connectable to multiple radio IP networks, and a communication method for the radio communication device.

BACKGROUND ART

In recent years, a wide spread of IP networks supporting Internet Protocol (IP) has been remarkable. With the wide spread of IP networks, it has been becoming common to convert a voice signal into IP packets (hereinafter, referred to as voice IP packets) by use of a so-called VoIP technology and then to transmit the voice IP packets through an IP network.

For the case of transmitting voice IP packets through the IP networks as described above, there has been disclosed a method for switching communication routes between telephone terminals on the basis of communication quality of the IP networks (for example, a transmission delay time of an IP packet) (For example, Patent Document 1).

In this method, voice IP packets are transmitted by use of RTP (real-time transport protocol), In addition, RTCP (RTP control protocol) is used to control the session of voice IP packets. A receiving side of voice IP packets determines the communication quality of the IP network on the basis of information included in a received RTCP packet, and switches a communication route between telephone terminals in accordance with the determination result.

Patent Document 1: Japanese Patent Application Publication No. 2002-344497 (pp. 7-8, FIGS. 5-7)

DISCLOSURE OF THE INVENTION

However, the above communication route switching method has the following problem. Specifically, since an average interval of transmitting RTCP packets is long (about two seconds), there may occur a case where the radio IP network constructed of a radio base station and the like cannot respond to a sharp degradation of the communication quality such as fading.

In a case of switching between the communication routes in multiple radio IP networks (for example, a cellular phone network and a wireless LAN network), a radio communication device can play a leading role to switch between the communication routes in response to a degradation of the communication quality in a downlink of a radio IP network. On the other hand, as for a degradation of the communication quality in an uplink of the radio IP network, there has been a problem that a communication controller, which is a receiving side, cannot determine whether or not to switch to a communication route via another radio IP network, because it is difficult for the communication controller to recognize the radio state of the radio IP network and the degradation of the communication quality. Moreover, a radio communication device after transmission also has a similar problem because it is difficult for the radio communication device to recognize the degradation of the communication quality on the receiving side.

Therefore, the present invention has been made in consideration of these circumstances, and aims to provide a communication route controller, a radio communication device, a communication route controlling method and a communication method for radio communication device whereby, when voice IP packets are transmitted via a radio IP network, a communication route can be appropriately switched to a communication route via another radio IP network while responding to even a sharp degradation of the communication quality.

In order to solve the foregoing problems, the present invention has the following aspects. To begin with, a first aspect of the present invention is summarized as a communication route control device (a switching server 100) for controlling a communication route to a radio communication device (for example, a cellular phone terminal 300A) connectable to a first radio IP network (a radio IP network 10A) for transmitting voice IP packets (for example, a VoIP packet P11) that are IP packets converted from a voice signal, and a second radio IP network (radio IP network 10B) different from the first radio IP network. The communication route control device includes: a relay unit (a MN-side receiving controller 113 and a CN-side communication route controller 119) configured to relay the voice IP packets transmitted from the radio communication device to a communication destination (an IP phone terminal 42); a receiving time acquiring unit (an MN-side receiving controller 113) configured to sequentially acquire a receiving time of a received voice IP packet that the relay unit receives; and a communication route controller (a transmission packet allocating unit 109 and a communication route controller 111) configured to switch the communication route from one via the first radio IP network to one via the second radio IP network, on the basis of a plurality of receiving times acquired by the receiving time acquiring unit.

According to such communication route controller, the communication route is switched from the one via the first radio IP network to the one via the second radio IP network on the basis of the receiving times of the multiple voice IP packets transmitted from the radio communication device to the communication destination. Accordingly, even when the communication quality is degraded in the uplink of the radio IP network, the communication route can be switched from the one via the first radio IP network to the one via the second radio IP network.

In addition, according to such communication route controller, it is quickly determined whether or not to switch the communication route on the basis of the receiving times of the voice IP packets that are IP packets converted from voice signals, and thus it is possible to take a measure against a degradation of the communication quality more quickly than in the case of using RTCP packets which are transmitted at long transmission intervals on average. To put it another way, this communication route controller is capable of supporting a radio IP network in which a shape degradation of the communication quality such as fading may occur.

In summary, a second aspect of the present invention according to the first aspect of the present invention, the communication route controller calculates an elapsed time from a predetermined reference time on the basis of the receiving time of the received voice IP packet, and switches the communication route from the one via the first radio IP network to the one via the second radio IP network, on the basis of a difference between the elapsed time and a standard transmission time (time t0) obtained by using a sequence number (seq) of the received voice IP packet and a time length (for example, the 20 ms) of the received voice IP packet.

In summary, a third aspect of the present invention according to the first aspect of the present invention, a voice encoding scheme used to encode the voice signal differs between the first radio IP network and the second radio IP network.

In summary, a fourth aspect of the present invention according to the first aspect of the present invention, the voice IP packet is allocated to a predetermined radio frame, and a structure of the radio frame differs between the first radio IP network and the second radio IP network.

In summary, a fifth aspect of the present invention according to the first aspect of the present invention, the first radio IP network includes a plurality of radio base stations (radio base stations 11 and 12) configured to execute radio communications with the radio communication device, and the communication route controller switches the communication route to a part (for example, the cellular phone terminal 300A) of a plurality of radio communication devices (cellular phone terminals 300A, 300B and 300N) executing radio communications with the same radio base station, when the communication route to the radio communication devices is switched, and determines whether or not to switch the communication route to the remaining radio communication devices (cellular phone terminals 300B and 300N) excluding the part of the radio communication devices after completion of the switching of the communication route to the part of the radio communication devices, on the basis of a plurality of the receiving times acquired by the receiving time acquiring unit.

Moreover, the communication route controller may further include a control-device-side silence detector (a silence detector 107) configured to determine whether or not the transmission of the voice IP packet is stopped, on the basis of an average reception interval of received voice IP packets already received and the reception interval of last-received voice IP packets. Then, the communication route controller may cancel the switching of the communication route while the control-device-side silence detector determines that the transmission of the voice IP packet is stopped.

A sixth feather of the present invention is summarized as a radio communication device (for example, the cellular phone terminal 300A) connectable to a first radio IP network (the radio IP network 10A) for transmitting voice IP packets (for example, the VoIP packet P11) that are IP packets converted from a voice signal, and a second radio IP network (the radio IP network 10B) different from the first radio IP network, the radio communication device including: a transmitter/receiver (a receiving controller 307 and a transmission packet allocating unit 309) configured to transmit and receive the voice IP packets via any of the first radio IP network and the second radio IP network; a silence detector (a silence detector 315) configured to detect whether or not the voice IP packets are transmitted at predetermined internals; and a pseudo packet transmitter (a transmission packet allocating unit 309 and a pseudo packet generator 311) configured to transmit pseudo packets of the voice IP packets at predetermined intervals via the first radio IP network while the silence detector determines that transmission of the voice IP packets is stopped, the first radio IP network being a network through which the transmitter/receiver transmitted the voice IP packets before the stop of the transmission.

A seventh aspect of the present invention is summarized as a communication route controlling method for controlling a communication route to a radio communication device connectable to a first radio IP network for transmitting voice IP packets that are IP packets converted from a voice signal, and a second radio IP network different from the first radio IP network. This method includes the steps of: receiving the voice IP packets transmitted from the radio communication device to a communication destination; sequentially acquiring a receiving time of a received voice IP packet thus received; switching the communication route from one via the first radio IP network to one via the second radio IP network, on the basis of a plurality of receiving times thus acquired. An eighth aspect of the present invention is summarized as communication method for a radio communication device connectable to a first radio IP network for transmitting voice IP packets that are IP packets converted from a voice signal, and a second radio IP network different from the first radio IP network. The method includes the steps of: transmitting and receiving the voice IP packets via any of the first radio IP network and the second radio IP network; determining whether or not the voice IP packets are transmitted at predetermined intervals; transmitting pseudo packets of the voice IP packet at predetermined intervals via the first radio IP network while it is determined that transmission of the voice IP packets is stopped, the first radio IP network being a network through which the voice IP packets are transmitted before the stop of the transmission.

According to the aspects of the present invention, it is possible to provide a communication route controller, a radio communication device, a communication route controlling method and a communication method for a radio communication device, which are capable of, in the case of transmitting voice IP packets via a radio IP network, appropriately switching to a communication route via a different radio IP network while responding to a sharp degradation of the communication quality.

BRIEF DESCRIPTION OF THE DRAWINGS

FIG. 6 is a flow diagram showing an operation in which the communication routes to multiple cellular phone terminals are switched sequentially in the communication system according to the embodiment of the present invention.

FIG. 7 is an explanatory diagram for explaining the pseudo packet transmission operation performed by the communication system according to the embodiment of the present invention.

BEST MODE FOR CARRYING OUT THE INVENTION

Figure 1:
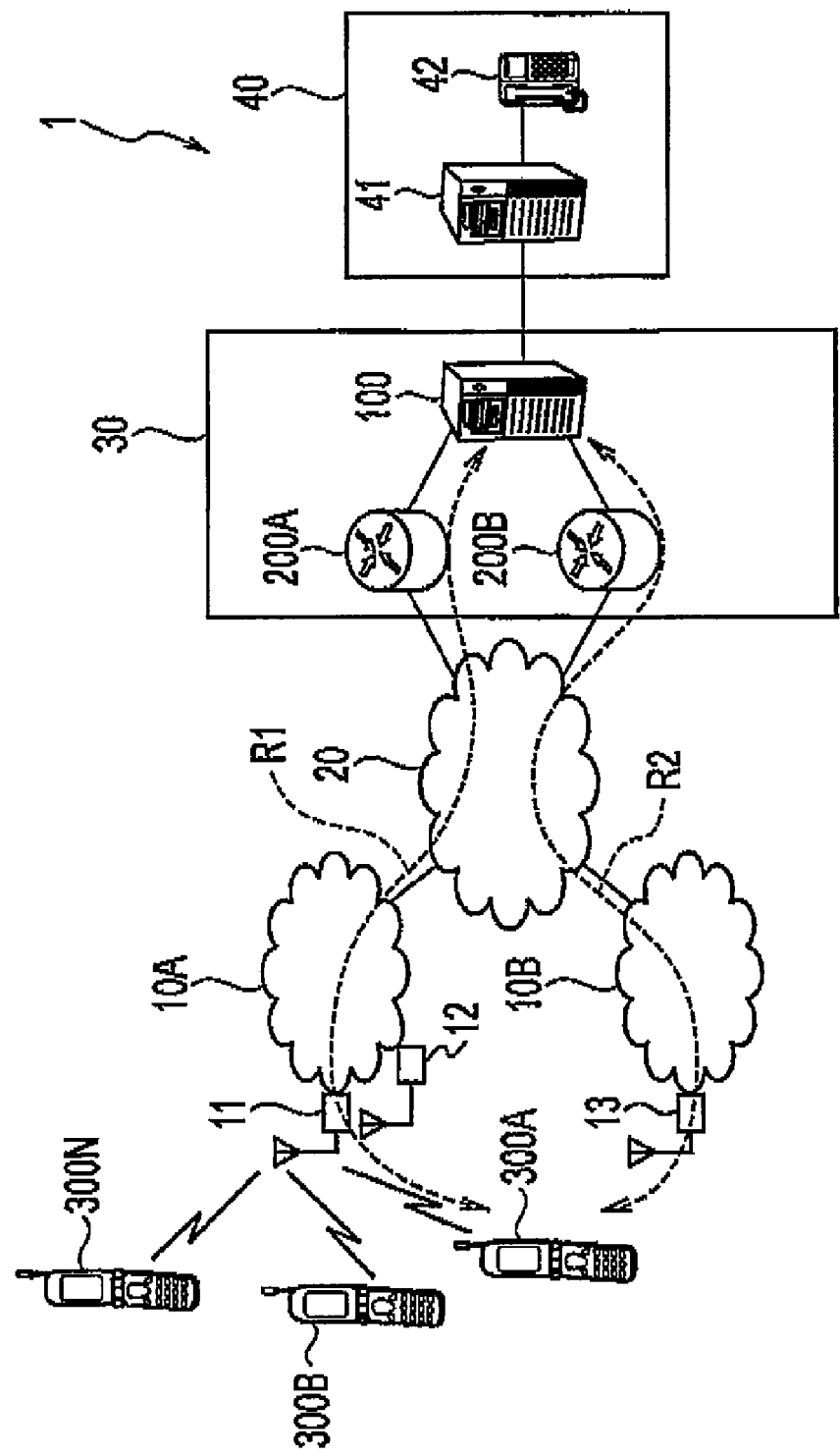
FIG. 1 is an entire schematic configuration diagram of a communication system according to an embodiment of the present invention.

Hereinafter, an embodiment of the present invention will be described. Note that similar or same reference numerals are given to similar or same elements in the following description of the drawings. In addition, it should be noted that the drawings are only schematic ones, and that a ratio of the dimensions is different from an actual one.

Thus, the specific dimensions must be determined in consideration of the following description. Moreover, obviously, the drawings include part in which a relation or ratio of the dimensions is different among the drawings.

(Entire Schematic Configuration of Communication System)

FIG. 1 is an entire schematic configuration diagram of a communication system 1 according to this embodiment. As shown in FIG. 1, the communication system 1 includes a radio IP network 10A and a radio IP network 10B. The radio IP network 10A is an IP network that allows IP packets to be transmitted.

The radio IP network 10A includes radio base stations 11 and 12 that each performs radio communications with cellular phone terminals 300A, 300B and 300N (radio communication devices). In this embodiment, the radio IP network 10A is a cellular phone network using CDMA (specifically HRPD of 3GPP2 standard) as a radio communication scheme.

The radio IP network 10B also allows IP packets to be transmitted as similar to the radio IP network 10A. The radio IP network 10B includes a radio base station 13 that performs radio communications with the cellular phone terminals 300A, 300B and 300N (the radio communication devices). Incidentally, the numbers of radio base stations and cellular phone terminals are not limited to the number shown in FIG. 1.

The radio IP network 10B uses a radio communication scheme different from that of the radio IP network 10A. In this embodiment, the radio IP network 10B uses mobile WiMAX in conformity with the IEEE802.16e standard as a radio communication method.

Through both the radio IP network 10A and the radio IP network 10B, transmitted are VoIP packets (voice IP packets) which are IP packets converted from voice signals. Note that the radio IP network 10A using CDMA and the radio IP network 10B using mobile WiMAX employ different voice encoding schemes for encoding voice signals. Specifically, the radio IP network 10A uses ITU-T G.729 and the radio IP network 10B uses ITU-T G.711.

The radio IP network 10A and the radio IP network 10B are connected to the Internet 20. A relay center 30 is also connected to the Internet 20.

In the relay center 30, network equipments for relaying IP packets transmitted and received by the cellular phone terminals 300A, 300B and 300N are arranged. To be more specific, in the relay center 30, a switching server 100 and VPN routers 200A and 200B are arranged.

The switching server 100 controls communication routes (communication routes R1 and R2) to the cellular phone terminals 300A, 300B and 300N. In this embodiment, the switching server 100 constitutes a communication route controller.

The VPN routers 200A and 200B each execute routing processing on IP packets. In addition, the VPN routers 200A and 200B each establish a VPN (IPSec) tunnel between the cellular phone terminal 300A (300B, 300N) and the switching server 100. By establishing this tunnel, virtualization of OSI layer 3 is implemented, whereby IP mobility is secured for the cellular phone terminal 300A (300B, 300N).

To be more precise, unlike Mobile IP (RFC2002), the cellular phone terminal 300A (300B, 300N) in this embodiment is capable of communicating with a communication destination (specifically, an IP phone terminal 42) while using both communication routes of the communication route R1 set via the radio IP network 10A and the communication route R2 set via the radio IP network 10B.

To put it another way, while the cellular phone terminal 300A (300B, 300N) performs the communications with the communication destination via the switching server 100, the communication destination can use the home address of the cellular phone terminal 300A (300B, 300N) as a destination address without knowing which one of the communication route R1 and the communication route R2 is used between the cellular phone terminal 300A (300B, 300N) and the switching server 100. Note that, in this embodiment, in the switching server 100, the home address of the cellular phone terminal 300A (300B, 300N) is associated with both a care of address assigned to the cellular phone terminal 300A (300B, 300N) in the radio IP network 10A and a care of address assigned to the cellular phone terminal 300A (300B, 300N) in the radio IP network 10B.

The relay center 30 (the switching server 100) is connected to a user premise 40 via a certain communication network (unillustrated). In the user premise 40, an IP phone exchange 41 and an IP phone terminal 42 are installed. The IP phone exchange 41 relays VoIP packets between the certain communication network and the IP phone terminal 42. The IP phone terminal 42 converts voice signals into VoIP packets and vice versa, as well as transmits and receives VoIP packets.

(Function Block Configuration of Communication System)

Next, a function block configuration of the communication system 1 will be described. Specifically, the function block configurations of the switching server 100 and the cellular phone terminal 300A included in the communication system 1 will be described.

In the following description, the switching server 100, the cellular phone terminal 300A (300B, 300N), and the IP phone exchange 41 and the IP phone terminal 42 installed in the user premise 40 are abbreviated as follows:

the switching server 100: SS the cellular phone terminal 300A (300B, 300N): MN the IP phone exchange 41, the IP phone terminal 42: CN (1) Switching Server 100

Figure 2:
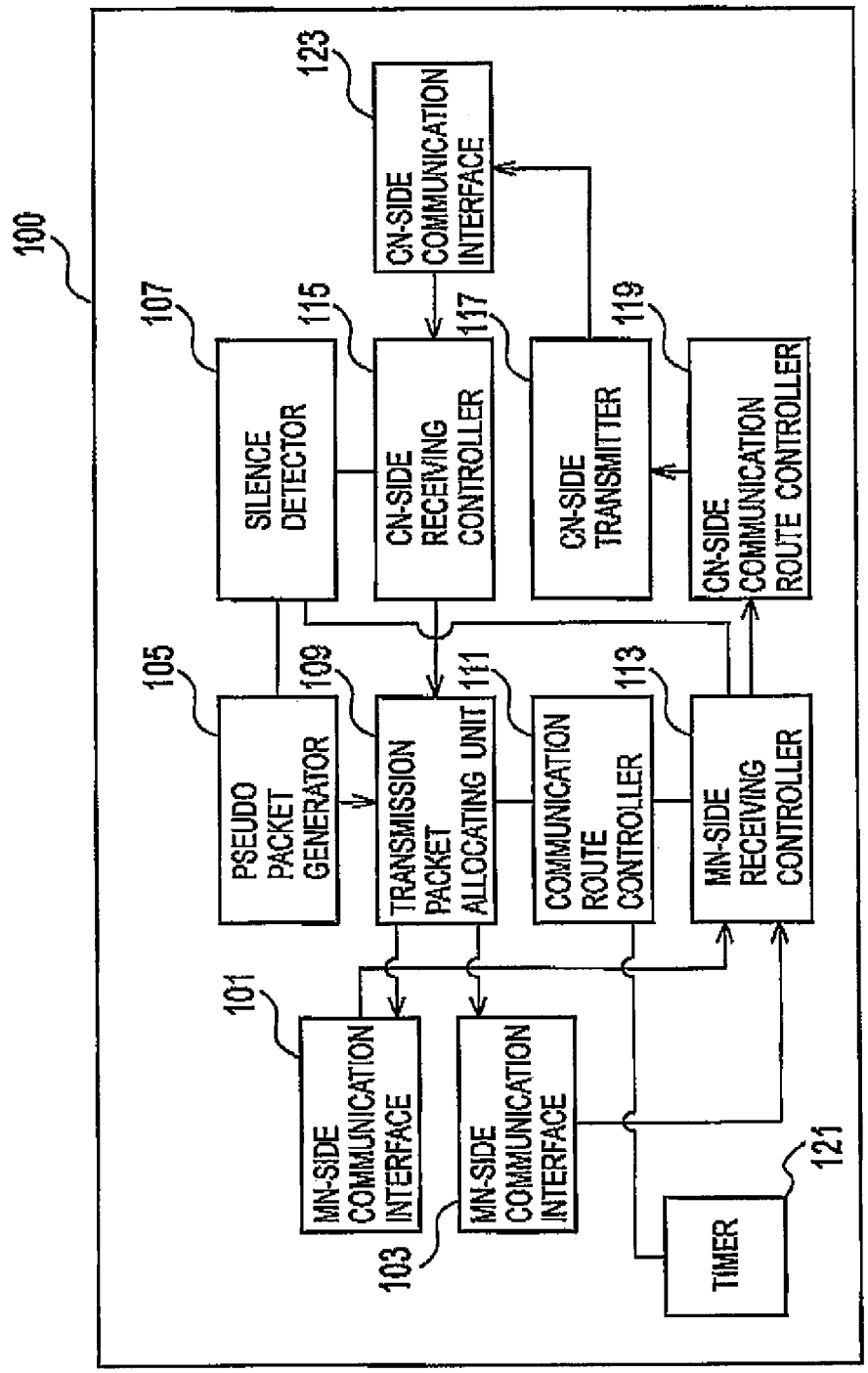
FIG. 2 is a function block configuration diagram of a communication route controller according to the embodiment of the present invention.

FIG. 2 is a function block configuration diagram of the switching server 100. As shown in FIG. 2, the switching server 100 includes an MN-side communication interface 101, an MN-side communication interface 103, and a CN-side communication interface 123 as communication interfaces.

The MN-side communication interfaces 101 and 103 are used to perform communications with MN. To be more specific, the MN-side communication interface 101 is connected to the VPN router 200A, and the MN-side communication interface 103 is connected to the VPN router 200B. The CN-side communication interface 123 is used to perform communications with CN.

In addition, the switching server 100 includes a pseudo packet generator 105, a silence detector 107, a transmission packet allocating unit 109, a communication route controller 111, an MN-side receiving controller 113, a CN-side receiving controller 115, a CN-side transmitter 117, a CN-side communication route controller 119 and a timer 121.

The pseudo packet generator 105 is capable of transmitting pseudo packets of the VoIP packet at certain intervals while the silence detector 107 stops transmission of VoIP packets, as in the case of a pseudo packet generator 311 which will be described later.

The silence detector 107 detects a state (a silent state) where communication (in the downlink) is not executed between the cellular phone terminal 300A and the IP phone terminal 42 which is a communication destination, on the basis of receiving times Of the VoIP packets received from CN through the CN-side receiving controller 115.

To be more precise, based on an average reception interval and the last reception interval of the VoIP packets that have already been received from CN, the silence detector 107 determines whether or not CN stops transmitting VoIP packets. Note that, the last reception interval of the VoIP packets indicates an interval between the VoIP packet last received, and the VoIP packet received immediately before the last-received VoIP packet.

In this embodiment, the silence detector 107 makes a determination on the silent state according to conditions shown in Table 1 and Table 2.

TABLE 1

|  | Threshold 1 | Threshold 2 | Threshold 3 | Threshold 4 | Threshold 5 |
| --- | --- | --- | --- | --- | --- |
| Silent state Determination Threshold (Unit: ms) | 50 | 300 | 70 | 500 | 1000 |

TABLE 2

|  | Contents |
| --- | --- |
| Determination Condition 1 | Among reception intervals of last-received 10 IP packets, all the reception intervals up to the 9th IP packet are equal to or smaller than the threshold 1, AND the last reception interval of the IP packets is equal to or larger than the threshold 2. |
| Determination Condition 2 | Among reception intervals of last-received 10 IP packets, all the reception intervals up to the 9th IP packet are equal to or smaller than the threshold 3, AND the last reception interval of the IP packets is equal to or larger than the threshold 4. |
| Determination Condition 3 | Any reception interval of IP packets is equal to or larger than the threshold 5. |

Note that the silent state determination method shown in Table 1 and Table 2 is described as an example, and any determination method based on other publicly-known methods can be used. In addition, in the case where the silent state continues for over several seconds in the downlink, i.e., in the direction from, the IP phone terminal 42 to the switching server 100 because a calling party of the cellular phone terminal 300A keeps talking, the silence detector 107 may detect using a RTCP packet that the communication route (for example, the communication route R1) is not disconnected. Instead, when the CN-side receiving controller 115 does not receive any VoIP packets for over one second, the silence detector 107 may actively confirm that the communication route is not disconnected, by using an ICMP packet (ping) of a relatively small packet size.

Moreover, on the basis of the VoIP packets received from MN, the silence detector 107 is capable of detecting a silent state in the uplink in addition to the downlink.

The transmission packet allocating unit 109 allocates IP packets, which are to be transmitted to the cellular phone terminal 300A, to any of the MN-side communication interface 101 and the MN-side communication interface 103 according to an instruction by the communication route controller 111. In addition, the transmission packet allocating unit 109 adds the care of address associated with the home address of the cellular phone terminal 300A, to an IP packet to be transmitted to the cellular phone terminal 300A.

The communication route controller 111 selects the communication route for the IP packet to be transmitted to the cellular phone terminal 300A. Specifically, the communication route controller 111 selects any of the communication route R1 and the communication route R2 (see FIG. 1) as the communication route for the IP packet to be transmitted to the cellular phone terminal 300A.

Additionally, the communication route controller 111 switches the communication route from the one via the radio IP network 10A to the one via the radio IP network 10B, for example, according to the/receiving times of multiple VoIP packets received by the MN-side receiving controller 113.

Specifically, the communication route controller 111 computes an elapsed time from a predetermined reference time (for instance, a time t0 shown in FIG. 7) on the basis of the receiving time of the received VoIP packet by use of data outputted by the timer 121. The communication route controller 111 switches, for example, from the communication route R1 to the communication route R2, on the basis of a difference between a standard transmission time and the computed elapsed time. Here, the standard transmission time is figured out using a sequence number (seq) of a VoIP packet included in the VoIP packet, and a time length (for example, 20 ms) of the VoIP packet. Further, the communication route controller 111 transmits a communication route switching request to MN.

The communication route controller 111 is capable of canceling the switching of the communication route while the silence detector 107 detects that the transmission of VoIP packets is stopped.

Moreover, in the case of switching a communication route to multiple mobile telephone terminals (for example, the cellular phone terminals 300A, 300B and 300N) that each perform radio communications with a single radio base station (for example, the radio base station 11), the communication route controller 111 is capable of switching only the communication route to one of the mobile telephone terminals (for example, the cellular phone terminal 300A) to another route. After completing the switching of the communication route to the one mobile telephone terminal, the communication route controller 111 determines whether or not to switch the communication route to the remaining mobile telephone terminals (the cellular phone terminals 300B and 300N) except for the one mobile telephone terminal, on the basis of the receiving times of multiple VoIP packets acquired by the MN-side receiving controller 113.

In this embodiment, the communication route controller 111 determines whether or not to switch the communication route according to conditions shown in Table 3 and Table 4.

TABLE 3

|  | Threshold 1 | Threshold 2 | Threshold 3 | Threshold 4 |
| --- | --- | --- | --- | --- |
| Communication Route Switching Determination Threshold (Unit: ms) | 80 | 70 | 50 | 40 |

TABLE 4

| | Contents |
|---|---|
| Determination Condition 1 | Elapsed time t − (seq * 20 ms) > Threshold 1 |
| Determination Condition 2 | As to last-received 10 IP packets, Time t − (seq * 20 ms) > Threshold 2 is satisfied three times or more |
| Determination Condition 3 | As to last-received 10 IP packets, Time t − (seq * 20 ms) > Threshold 3 is satisfied five times or more |
| Determination Condition 4 | Reception intervals of last-received 10 IP packets > Threshold 4 |

Note that, in this embodiment, the sequence number (seq)*20 ms is used as a reference because a codec (voice encoding scheme) using a frame length of 20 ms is used. In the case where the frame length is 30 ms, the sequence number (seq)*30 ms may be used as a reference.

The MN-side receiving controller 113 executes control for IP packets received from the cellular phone terminal 300A. In particular, in this embodiment, the MN-side receiving controller 113 sequentially acquires the receiving times of VoIP packets received through any of the MN-side communication interface 101 and the MN-side communication interface 103. In this embodiment, the MN-side receiving controller 113 constitutes a receiving time acquiring unit. Moreover, the MN-side receiving controller 113 relays the VoIP packets received from the cellular phone terminal 300A to the CN-side communication route controller 119.

The CN-side receiving controller 115 executes control for IP packets received from the IP phone exchange 41. In particular, in this embodiment, the CN-side receiving controller 115 is capable of sequentially acquiring the receiving times of VoIP packets received through the CN-side communication interface 123. Moreover, the CN-side receiving controller 115 relays the VoIP packets received from the IP phone exchange 41 to the transmission packet allocating unit 109.

The CN-side transmitter 117 relays IP packets, which are outputted from the CN-side communication route controller 119, to the CN-side communication interface 123.

The CN-side communication route controller 119 controls the communication route for the IP packet to be transmitted to CN, on the basis of the destination address included in the IP packet relayed by the MN-side receiving controller 113. In this embodiment, the MN-side receiving controller 113 and the CN-side communication route controller 119 constitute a relay unit that relays VoIP packets to be transmitted to a communication destination from the cellular phone terminal 300A.

The timer 121 outputs time information that is used to compute the elapsed time by the Communication route controller 111.

(2) Cellular Phone Terminal 300A

Figure 3:
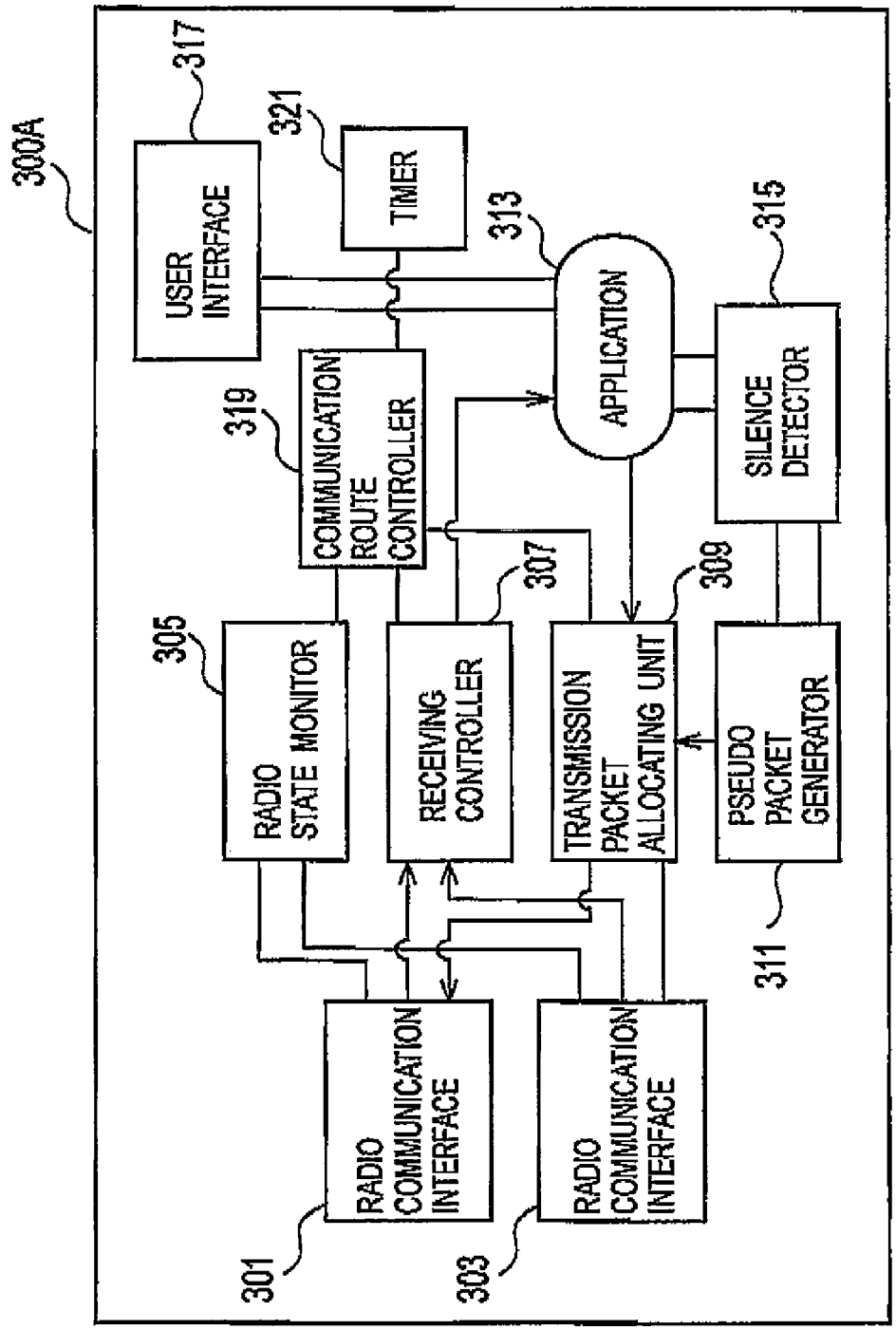
FIG. 3 is a function block configuration diagram of a radio communication device according to the embodiment of the present invention.

FIG. 3 is a function block configuration diagram of the cellular phone terminal 300A. Incidentally, the cellular phone terminals 300B and 300N have the same function block configuration as that of the cellular phone terminal 300A. Hereinbelow, description for the same functions as those in the aforementioned switching server 100 will be omitted if not necessary, As shown in FIG. 3, the cellular phone terminal 300A includes a radio communication interface 301 and a radio communication interface 303. The radio communication interface 301 is used for communications via the radio IP network 10A. In other words, the radio communication interface 301 complies with the CDMA (HRPD of the 3GPP2 standard) standard The radio communication interface 303 is used for communications via the radio IP network 10B. In other words, the radio communication interface 303 complies with the mobile WiMAX standard.

Moreover, the cellular phone terminal 300A includes a radio state monitor 305, a receiving controller 307, a transmission packet allocating unit 309, a pseudo packet generator 311, an application 313, a silence detector 315, a user interface 317, a communication route controller 319 and a timer 321.

The radio state monitor 305 monitors the states of radio signals received by the radio communication interface 301 and the radio communication interface 303.

Moreover, the radio state monitor 305 is capable of measuring the state (for example, RSSI) of the radio IP network 10A or the radio IP network 10B through the radio communication interface 301 or the radio communication interface 303, respectively, in response to an instruction from the switching server 100, and then of notifying the switching server 100 of the measurement result. In addition, the radio state monitor 305 is also capable of notifying the switching server 100 of identifiers of radio base, stations facing the radio communication interface 301 and the radio communication interface 303.

The receiving controller 307 executes control for IP packets received from the switching server 100. In particular, in this embodiment, the receiving controller 307 sequentially acquires the receiving times of VoIP packets received through any of the radio communication interface 301 and the radio communication interface 303. Moreover, the receiving controller 307 relays the VoIP packets received from the switching server 100, to the application 313.

The transmission packet allocating unit 309 allocates IP packets, which are to be transmitted to the switching server 100, to any of the radio communication interface 301 and the radio communication interface 303, Note that, in this embodiment, the receiving controller 307 and the transmission packet allocating unit 309 constitute a transmitter/receiver.

While the silence detector 315 detects that the transmission of the VoIP packets is stopped, the pseudo packet generator 311 is capable of transmitting pseudo packets of the VoIP packet at predetermined intervals through the radio IP network (for example, the radio IP network 10A) through which the transmission packet allocating unit 309 has transmitted the VoIP packets before the transmission is stopped. In this embodiment, the transmission packet allocating unit 309 and the pseudo packet generator 311 constitute a pseudo packet transmitter.

Specifically, while the silence detector 315 stops the transmission of the VoIP packet, the pseudo packet generator 311 generates pseudo packets whose destination address and transmission timing are the same as those of the VoIP packet, and outputs the pseudo packets to the transmission packet allocating unit 309.

The application 313 is composed of various types of application software (for example, an IP phone) needed to provide the functions of the cellular phone terminal 300A. An IP phone application included in the application 313 executes two-way conversions between voice signals and VoIP packets. When no voice signal is inputted through the user interface 317 (more specifically, the inputted voice signal is equal to or lower than a predetermined level), the IP phone application stops transmitting the VoIP packet.

The silence detector 315 detects a case where the application 313 (IP phone) does not generate any VoIP packets, that is, detects whether or not VoIP packets are transmitted at predetermined intervals. Incidentally, the application 313 (IP phone) may be designed to generate no VoIP packet when the voice signals (or VoIP packets) are not inputted through the user interface 317.

In this embodiment, the silence detector 315 makes a determination on the silent state on the basis of the silent state determination thresholds shown in Table 1, as is the case with the switching server 100. Here, FIG. 7 shows specific examples of silent state determination processing performed by the silence detector 315 and pseudo packet transmission processing performed by the pseudo packet generator 311.

As shown in FIG. 7, VoIP packets (more specifically, RTF packets) are transmitted every 20 ms. The size of a VoIP packet is 65 byte. In FIG. 7, a VoIP packet P11 is transmitted at time t0, and then VoIP packets P12 and P13 are sequentially transmitted every 20 ms. Here, the silence detector 315 detects the silent state at time t1.

When the silence detector 315 detects the silent state, the pseudo packet generator 311 transmits a pseudo packet P21 at time t2. Instead, the pseudo packet generator 311 may transmit the pseudo packet P21 at time t2' in synchronization with the VoIP packet transmission cycle. In this embodiment, however, the pseudo packet generator 311 transmits the pseudo packet P21 after a predetermined threshold (5 ms) passes (at the time t2).

In addition, the pseudo packet generator 311 transmits pseudo packets in an HPRD transmission cycle (a predetermined radio frame). In this embodiment, the VoIP packet transmission cycle is 20 ms, whereas the HPRD transmission cycle is 26.6 ms.

The transmission timing of the pseudo packet P21 that is transmitted for the first time after the silence detector 315 determines that it is in the silent state may be included in a radio packet (unillustrated) of 121 byte transmitted in accordance with the next HPRD transmission cycle. In the case of the example in FIG. 7, the predetermined threshold (5 ms) may be extended up to 15 ms.

In this embodiment, the VoIP packet transmitted through the radio IP network 10A is allocated to the HPRD transmission cycle, i.e., a predetermined radio frame, The structure of the radio frame differs between the radio XP network 10A and the radio IP network 10B.

The pseudo packet generator 311 sequentially transmits pseudo packets P21 to P2n. The pseudo packets P21 to P2n have almost the same structure as that of the VoIP packets P11 to P13, as described above.

Then, the silence detector 315 detects the transmission of the VoIP packet P14 at time t3. When the silence detector 315 detects the transmission of the VoIP packet P14, the pseudo packet generator 311 stops transmitting the pseudo packet. Then, after the VoIP packet P14, VoIP packets P15 and P16 are transmitted.

As shown in FIG. 3, the user interface 317 provides an interface with a user of the cellular phone terminal 300A. The user interface 317 includes an operation key unit and an image display unit. Additionally, the user interface 317 also includes a communication interface used to connect a personal computer and the like.

The communication route controller 319 switches the communication route, for example, from the one via the radio IP network 10A to the one via the radio IP network 10B, on the basis of the state of the radio signal monitored by the radio state monitor 305, and the receiving times of the VoIP packets acquired by the receiving controller 307.

The timer 321 outputs time information used by the communication route controller 319 to make a determination as to the communication route switching.

(Operation of Communication System)

Next, operations of the communication system 1 will be described. To be more precise, description will be given for (1) a communication route switching operation, (2) a pseudo packet transmission operation and (3) a sequential switching operation for communication routes to multiple cellular phone terminals.

(1) Communication Route Switching Operation

Figure 4:
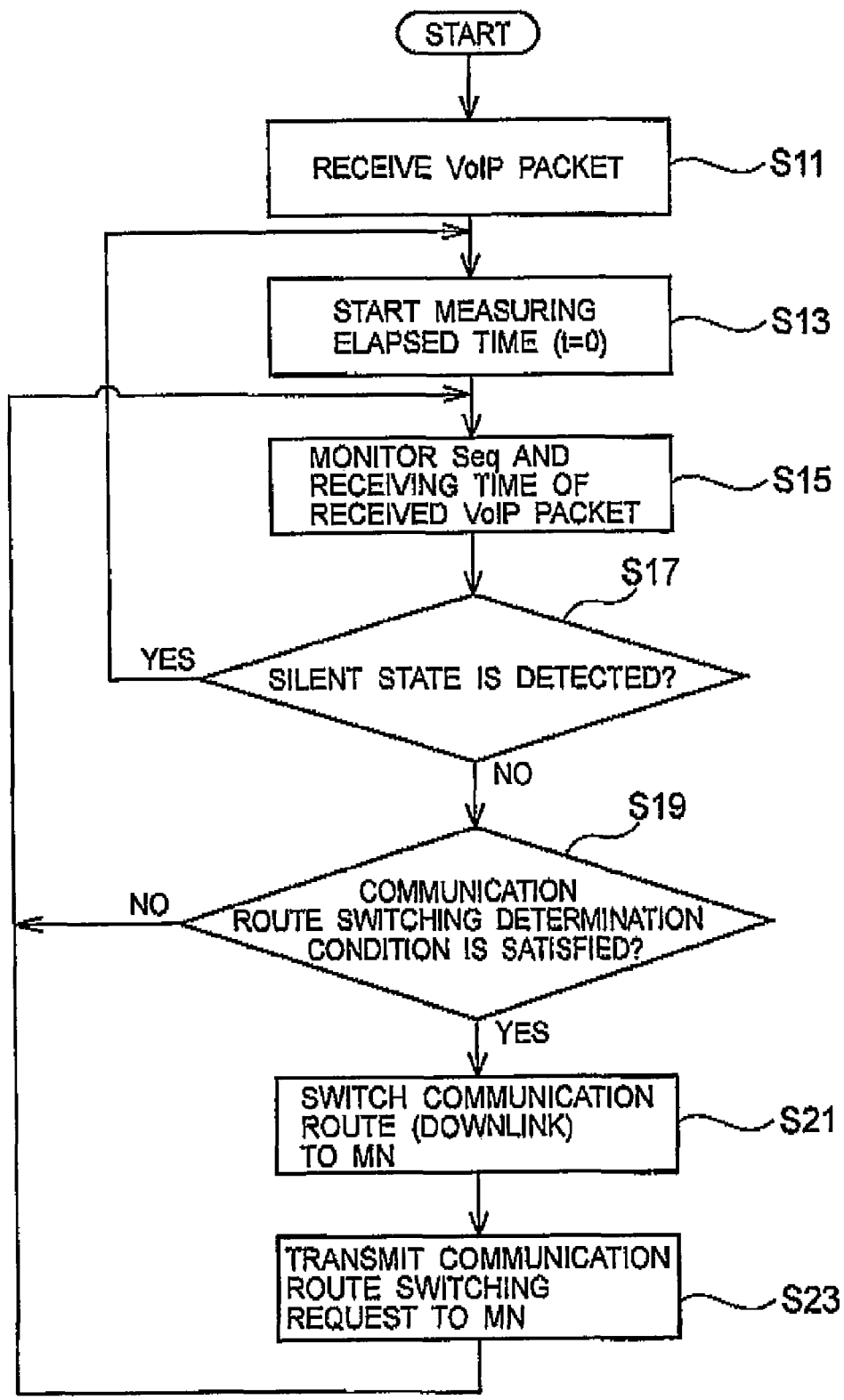
FIG. 4 is a flow diagram showing a communication route switching operation performed by the communication system according to the embodiment of the present invention.

FIG. 4 is a flow diagram showing the communication route switching operation performed by the switching server 100. As shown in FIG. 4, in step S11, upon the start of communication (voice call) between MN (for example, the cellular phone terminal 300A) and CN (IP phone terminal 42), the switching server 100 (SS) receives VoIP packets from both MN and CN. Here, in step S11, the communication is assumed to start using the communication route R1, i.e., the radio IP network 10A (see FIG. 1).

Upon receipt of a VoIP packet having a sequence number (seq) 0 with the start of the communications, the switching server 100 starts measuring the elapsed time (t) from the receiving time of the VoIP packet (for example, the time t0) in step S13.

In step S15, the switching server 100 monitors sequence numbers (seq) of VoIP packets sequentially received, and the receiving times of the VoIP packets.

In step S17, the switching server 100 determines whether or not the silent state is detected. To be more precise, the switching server 100 determines whether or not the communication (voice call) between MN and CN is in the silent state, according to the conditions shown in Table 1 and Table 2.

When the silent state is detected (YES in step S17), the switching server 100 repeats the operation from S13.

When the silent state is not detected (NO in step S17), the switching server 100 determines whether or not the communication route switching condition is satisfied. Precisely, according to the conditions shown in Table 3 and Table 4, the switching server 100 determines whether or not the communication route switching condition is satisfied.

When the communication route switching condition is satisfied (YES in step S19), the switching server 100 switches the communication route to MN in step S21. Specifically, the switching server 100 switches the communication route R1 to the communication route R2.

When the communication route switching condition is not satisfied (NO in step S19), the switching server 100 repeats the operation from, step S15.

In step S23, the switching server 100 transmits a switching request to MN to switch the communication route from the communication route R1 to the communication route R2.

After the completion of the operation in steps S21 and S23, the communication route is changed so that VoIP packets can be transmitted and received between MN and CN not through the communication route R1 but through, the communication route R2.

(2) Pseudo Packet Transmission Operation

Figure 5:
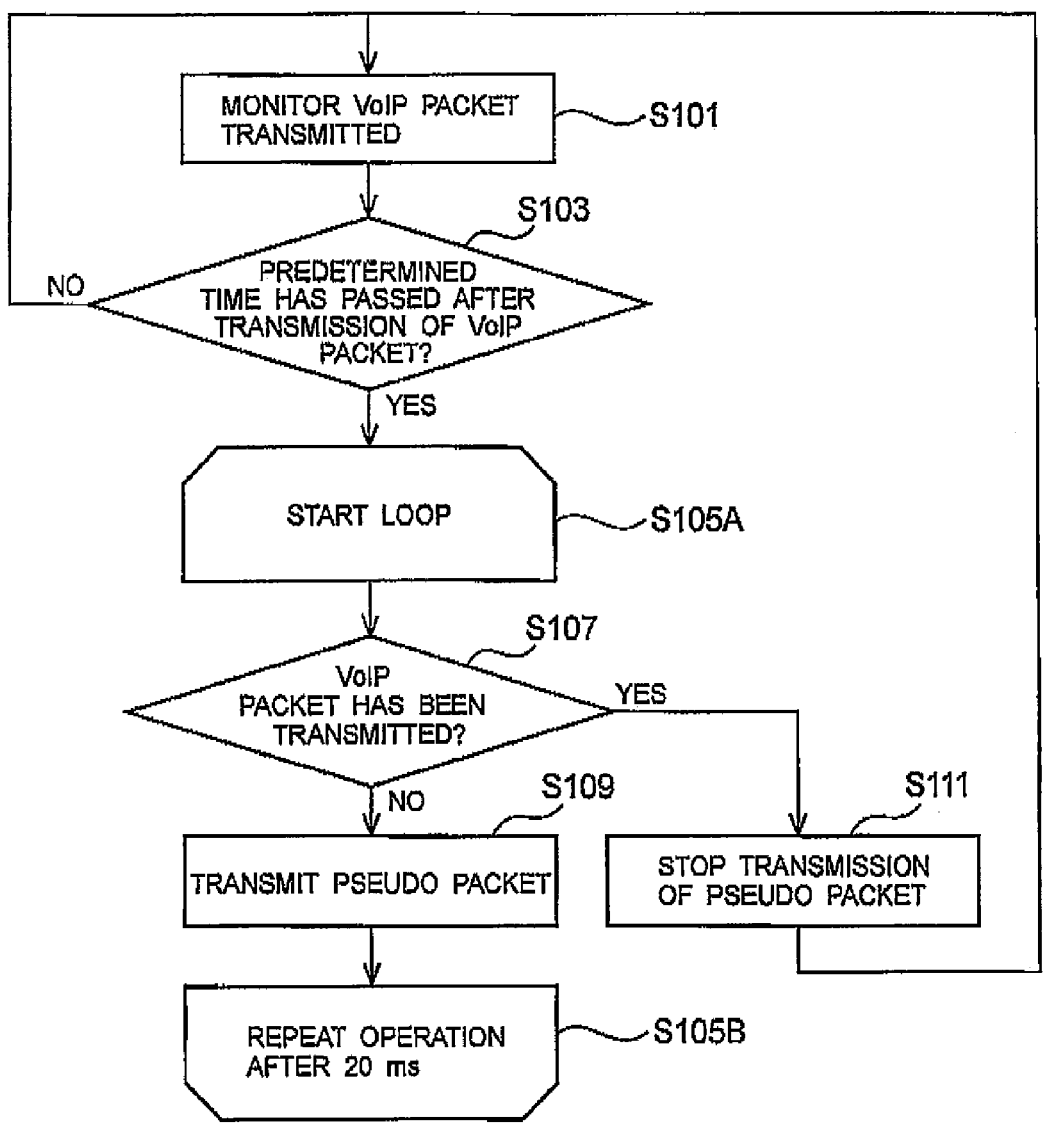
FIG. 5 is a flow diagram showing a pseudo packet transmission operation performed by the communication system according to the embodiment of the present invention.

FIG. 5 is a flow diagram showing the pseudo packet transmission operation performed by the cellular phone terminal 300A. As shown in FIG. 5, in step S101, the cellular phone terminal 300A (MK) monitors VoIP packets transmitted to CN through SS. More specifically, the cellular phone terminal 300A monitors the transmission times of the VoIP packets transmitted to CN. Here, the VoIP packets are assumed to be transmitted to CN by use of the communication route R1.

In step S103, the cellular phone terminal 300A determines whether or not the predetermined time (for example, the silent state determination threshold shown in Table 1) has passed after the transmission time of the last transmitted VoIP packet.

When the predetermined time has passed after the transmission time of the last transmitted VoIP packet (YES in step S103), the cellular phone terminal 300A executes loop processing of steps S105A to S105B every 20 ms.

In step S107, the cellular phone terminal 300A determines whether or not the VoIP packet has been transmitted to CN.

When the VoIP packet has not been transmitted to CN (NO in step S107), the cellular phone terminal 300A transmits the pseudo packet in step S109. For example, as shown in FIG. 7, the cellular phone terminal 300A transmits the pseudo packet P21 to SS by use of the communication route R1, that is, the same communication route as the communication route through which the VoIP packets have been transmitted.

When the VoIP packet has been transmitted to SS (YES in step S107), the cellular phone terminal 300A stops transmitting the pseudo packet in step S111.

(3) Sequential Switching Operation for Communication Routes to Multiple Cellular Phone Terminals FIG. 6 is a flow diagram showing the sequential switching operation for the communication routes to multiple cellular phone terminals. Here, it is assumed that multiple MNs, i.e., the cellular phone terminals 300A, 300B and 300N perform radio communications with a single radio base station, i.e., the radio base station 11.

As shown in FIG. 6, in step S201, the switching server 100 (SS) monitors the reception intervals of VoIP packets transmitted from each MN. Specifically, the switching server 100 monitors the reception intervals of VoIP packets on the basis of the receiving times of the VoIP packets transmitted from each MN. In addition, the switching server 100 acquires the identifier of the radio base station 11 executing the radio communication with each MN. Note that, the identifier of the radio base station 11 can be included, for example, in an IP packet transmitted from each MN.

In step S203, the switching server 100 determines whether or not the communication route switching condition (see Table 3 and Table 4) is satisfied by the reception intervals of VoIP packets transmitted from any of MNs (for example, the cellular phone terminal 300A).

When the condition is satisfied (YES in step S203), the switching server 100, in step S205, determines whether or not the communication route switching condition is satisfied by the reception intervals of VoIP packets transmitted from different MN connected to the same base station (the radio base station 11) as that of MN (cellular phone terminal 300A) having transmitted the VoIP packets that satisfy the condition, as in the case with MN (cellular phone terminal 300A) determined as satisfying the condition in step S203.

On the other hand, when the condition is not satisfied (NO in step S203), the switching server 100 repeats the operation from step S201.

When different MN also satisfies the condition (YES in step S205), the switching server 100, in step S207, instructs multiple MNs satisfying the condition to measure a state (for example, RSSI or CIR) of a switched-to communication route (the radio IP network 10B) (including an instruction to issue a notification of the measurement result).

To put it another way, in this embodiment, when the reception intervals of VoIP packets from multiple MNs connected through the same radio base station are in the same condition, it is inferred that the degradation of the communication quality of the uplink is not caused by a change in the state of the radio communication section, but caused by the traffic congestion.

When different MN does not satisfy the condition (NO in step S205), the switching server 100, in step S209, switches the communication route for MN determined as satisfying the condition in step S203. Incidentally, the specific switching method is the same as in steps S21 and S23 described above.

In step S211, the switching server 100 switches the communication route to MN (for example, the cellular phone terminal 300A) having the switched-to communication route in the best state among multiple MNs, on the basis of the measurement result of the state of the switched-to communication route (the radio IP network 10B) notified from each MN. More specifically, the switching server 100 switches the communication route R1 (via the radio IP network 10A) to MN (the cellular phone terminal 300A) having the switched-to communication route in the best state, to the communication route R2 (via the radio IP network 10B).

In step S213, the switching server 100 determines whether or not an improvement is made in the reception Intervals of the VoIP packets transmitted from different MNs (the cellular phone terminals 300B and 300N) not having the communication routes switched. To be more specific, the switching server 100 determines whether or not the reception intervals of VoIP packets transmitted from each of the different MNs have been changed to those not satisfying the communication route switching condition.

Here, if the communication routes to all MNs are switched all together, a sharp increase of the traffic in the switched-to communication route may also cause the same situation in the switched-to communication route. For this reason, the switching of the communication route is performed by targeting only a part of MNs. Such switching disperses the traffic into the individual radio IP networks, so that the communication quality for different MNs not having the communication routes switched may possibly be improved.

When the reception intervals of the VoIP packets transmitted from different MNs are improved (YES in step S213), the switching server 100 repeats the operation from step S201. In other words, the switching server 100 does not switch the communication routes to these different MNs.

On the other hand, when the reception intervals of the VoIP packets transmitted from these different MNs are not improved (NO in step S213), the switching server 100 repeats the operation from step S211. In other words, the switching server 100 switches the communication route R1 (via the radio IP network 10A) to the communication route R2 (via the radio IP network 10B) for MN (for example, the cellular phone terminal 300B) having the switched-to communication route in the best state among these MNs (the cellular phone terminals 300B and 300N).

(Effects)

By use of the switching server 100, the communication route is switched from the communication route R1 to the communication route R2 on the basis of the receiving times of multiple VoIP packets transmitted from MN to CN. Thus, even when the communication quality (jitter) is degraded in the uplink on the radio IP network 10A (or the radio IP network 10B), the communication route can be switched to another one.

Moreover, by use of the switching server 100, it is quickly determined whether or not to switch the communication route on the basis of the receiving times of the VoIP packets that are IP packets converted from voice signals, and thus it is possible to take a measure against a degradation of the communication quality more quickly than in the case of using RTCP packets which are transmitted at long transmission intervals on average. In other words, the switching server 100 is capable of supporting the radio IP networks 10A and 10B in which a sharp degradation of the communication quality such as fading may occur.

By use of the switching server 100, it is determined whether or not to switch the communication route on the basis of a difference between: the standard transmission time obtained using the sequence number (seq) of a VoIP packet received by the switching server 100 and the time length (20 ms) of the VoIP packet; and an elapsed time from a predetermined reference time (for example, the time to shown in FIG. 10). In other words, when the silent state is detected, the predetermined reference time is set again as needed (see step S13 in FIG. 4), thereby changing the range used to determine whether to switch the communication route. Hence, the accuracy in a determination as to whether or not to switch the communication route can be enhanced.

Note that, since the switching server 100 only measures the jitters of the multiple VoIP packets transmitted from MN to CN without buffering the multiple VoIP packets, the transmission delay of the VoIP packet is not increased.

In addition, in the case of switching the communication routes to multiple MNs (cellular phone terminals 300A, 300B and 300N) performing radio communications with a single radio base station, the switching server 100 firstly switches only the communication route to a part of MNs (for example, the cellular phone terminal 300A) (see step S211 in FIG. 6). Then, after the communication route to the part of MNs is switched, it is determined whether or not to switch the communication route to each of the remaining MNs (the cellular phone terminal 300B and 300N) excluding the part of MNs.

Accordingly, even when an increase of traffic causes a degradation of the communication quality on the uplink in a particular radio base station (for example, the radio base station 11), it is possible to avoid a sharp increase of the traffic to be processed by a radio base station (for example, the radio base station 13) included in a switched-to radio IP network.

Moreover, the communication system 1 (for example, the switching server 100 or the cellular phone terminal 300A) is capable of detecting the silent state, and thus is prevented from determining the reception intervals of VoIP packets including the silent state. In addition, by use of the cellular phone terminal 300A, pseudo packets can be transmitted at a time Of the silent state. Thus, the reception intervals of VoIP packets, i.e., the communication quality (jitter) are measured more accurately.

In this embodiment, as shown in FIG. 7, the pseudo packet P21 is transmitted after the predetermined threshold (5 ms) has passed (time t2). When the threshold is sufficiently small in comparison with the communication route switching determination threshold (see Table 3) in the switching server 100, the switching server 100 receives the pseudo packet P21 before the reception interval reaches the communication route switching determination threshold. Hence, the switching server 100 determines that it is in the silent state. Furthermore, upon receipt of a pseudo packet, the switching server 100 sets the predetermined reference time (time t0) again, as described above, thereby enhancing the accuracy in a determination as to whether or not to switch the communication route.

On the other hand, when the predetermined threshold is set to be too long, the switching server 100 cannot receive the pseudo packet at an appropriate timing, and thereby switches the communication route on the basis of the communication route switching determination threshold. However, upon receipt of the pseudo packet, the switching server 100 can restore the post-switching state to the state before the switching of the communication route.

(Other Embodiments)

As has been described above, the contents of the present invention have been disclosed based on the one embodiment of the present invention. It should not be understood that the description and drawings constituting part of this disclosure limit the present invention. From this disclosure, it is obvious to those skilled in the art that there are various alternative embodiments.

For example, although the foregoing embodiment takes the configuration in which the switching server 100 determines whether or not to switch the communication route, the cellular phone terminal 300A may determine whether or not to switch the communication route on the basis of the reception intervals of VoIP packets received from the switching server 100. In this case, the cellular phone terminal 300A may determine whether or not to switch the communication route also in consideration of the radio communication state (for example, RSSI or CIR).

Furthermore, the switching server 100 may acquire application information identifying the application, and change the silent state determination thresholds (Table 1) and the determination conditions (Table 2) according to the acquired application information. Incidentally, as the application, an IP phone allocation and IPTV application can be named.

Moreover, although the foregoing embodiment has been described by taking the cellular phone terminals 300A (300B and 300N) as examples, a personal computer in which a radio communication card and IP phone application software (a so-called softphone) are mounted, or the like may be used. As described above, the present invention apparently includes various embodiments and the like which are not described herein. Thus, the technical scope of the present invention is only defined by the subject matters according to the scope of claims appropriate from the foregoing description.

It should be noted that the entire content of Japanese Patent Application No. 2006-089134 (filed on 28 Mar., 2006) is incorporated in the present application by reference.

Industrial Applicability

As described above, a communication route controller, a radio communication device, a communication route controlling method and a communication method for a radio communication device according to the present invention are capable of, in the case of transmitting voice IP packets via a radio IP network, appropriately switching to a communication route via a different radio IP network while responding a sharp degradation of the communication quality, and thereby are effective in radio communications such as mobile communications.

The invention claimed is:

1. A communication route control device for controlling a communication route to a radio communication device connectable to a first radio IP network that includes a plurality of radio base stations configured to communicate with the radio communication device, and a second radio IP network different from the first radio IP network, the communication route control device comprising:

a relay unit configured to relay the voice IP packets transmitted from the radio communication device to a communication destination; and a communication route controller that calculates an elapsed time from a receiving time of a received voice IP packet, obtains a standard transmission time by using a sequence number of the received voice IP packet and a time length of the received voice IP packet, and switches the communication route from one via the first radio IP network to one via the second radio IP network, on the basis of whether a difference between the elapsed time and the standard transmission time is greater than a predetermined threshold, wherein after the communication route controller switches the communication route to a part of a plurality of radio communication devices that communicate with the same radio base station, the communication route controller determines whether or not to switch the communication route to the remaining radio communication devices excluding the part of the radio communication device.

2. The communication route control device according to claim 1, wherein a voice encoding scheme used to encode the voice signal differs between the first radio IP network and the second radio IP network.

3. The communication route control device according to claim 1, wherein the voice IP packet is allocated to a predetermined radio frame, and a structure of the radio frame differs between the first radio IP network and the second radio IP network.

4. A communication route control method for controlling a communication route to a radio communication device connectable to a first radio IP network that includes a plurality of radio base stations configured to communicate with the radio communication device, and a second radio IP network different from the radio IP network, the method comprising the steps of:

relaying the voice IP packets transmitted from the radio communication device to a communication destination;

calculating an elapsed time from a receiving time of a received voice IP packet;

obtaining a standard transmission time by using a sequence number of the received voice IP packet and a time length of the received voice IP packet switching the communication route from one via the first radio IP network to one via the second radio IP network, on the basis of whether a difference between the elapsed time and the standard transmission time is greater than a predetermined threshold; and determining, after switching the communication route to a part of a plurality of radio communication devices that communicate with the same radio base station, whether or not to switch the communication route to the remaining radio communication devices excluding the part of radio communication device.

* * * * *